United States Patent Office 3,721,642
Patented Mar. 20, 1973

3,721,642
POLYMERIZABLE UNSATURATED POLYESTER COMPOSITION CONTAINING THERMOPLASTIC ADDITIVE
Edmund Schalin and Joseph J. Dietrich, Mentor, Clarence L. Sturm and Reynold A. Berkey, Painesville, and John R. Semancik, Mentor, Ohio, assignors to Diamond Shamrock Corporation, Cleveland, Ohio
No Drawing. Filed Dec. 10, 1970, Ser. No. 96,994
Int. Cl. C08f 21/02; C08g 51/04, 51/18
U.S. Cl. 260—40 R   12 Claims

ABSTRACT OF THE DISCLOSURE

Thermosetting molding compositions are prepared using polymerizable unsaturated polyesters, polymerizable unsaturated monomers and polymers derived from the polymerization of a mixture of vinyl chloride and vinyl acetate. Fillers and reinforcing agents are incorporated in the compositions to obtain the desired physical and chemical properties in end use applications. These compositions produce molded articles having low shrinkage, dimensional stability, and improved surface smoothness characteristics.

BACKGROUND OF THE INVENTION

(1) Field of the invention

This invention relates to thermosetting resinous molding compositions prepared from an unsaturated polyester component, a monomer component containing a

group and a thermoplastic polymer component derived from the polymerization of a mixture of vinyl chloride and vinyl acetate. These compositions exhibit little or no volume shrinkage when cured and, as a result, yield glass fiber-reinforced or other reinforced articles with exceptionally smooth surfaces and dimensional stability characteristics when cured under the usual conditions of heat and pressure.

Further, this invention relates to the preparation of the thermoplastic polymer component by polymerization of ethylenically unsaturated materials and particularly those polymers derived from the polymerization of mixtures of vinyl chloride and vinyl acetate. In formulating thermosetting resin compositions, fillers and reinforcing agents are incorporated in the compositions to develop the physical and chemical properties desired in end use applications. The type and amount of filler and reinforcing agents incorporated into the compositions often are limited by the viscosity requirements of the application and depend on whether the composition is used as a wet layup, premix (a bulk molding compound), or sheet molding compound.

Incorporation of the thermoplastic polymer component in the thermosetting resin composition does not significantly affect the viscosity of the resulting formulations, allows high filler and reinforcing agent loadings, and in combination with the other formulation components imparts the desired smooth surface, low shrink and dimensional stability characteristics to the cured composition.

(2) Description of the prior art

Polyester resin compositions containing fillers and reinforcing agents have been used for wet layup (preform and mat), premix and sheet molding compound molding operations for some time. These compositions have been used in transfer molding, compression molding, injection molding and mat and preform molding operations.

Mat and preform matched die molding methods are utilized for the high-speed production of molded products which must exhibit high impact strength, excellent surfaces, and uniform appearance. These two basic methods of fabrication differ in the type of glass reinforcing agents used in fabricating the molded product. Mat reinforcement is more appropriate when articles to be molded are basically flat or incorporate very few and well-distributed changes in the structural matter. Serving trays and electrical sheets are examples. Preform reinforcements generally are used when the article to be molded has a variety of curves within the part itself. Examples are chairs, tote boxes, and automotive parts.

In the premix molding process, the molding composition is prepared, or premixed, to a putty-like consistency before it is placed into the mold. This "premix" also is known as "dough molding compound," "flow mix," or "bulk molding compound." The premix process permits elimination of the necessity and expense of making preforms or die cut mat blanks and allows use of a greater variety of fibers and fillers in their simplest forms. It also makes possible rapid molding of parts having varying wall thicknesses, intricate contours, molding inserts, holes, slots, grooves, and bosses with a consequent reduction in cost and minimum waste. Premix molding may be done in transfer molds, compression molds, or injection molds.

Sheet molding compound, SMC, is a reinforced thermosetting composition in sheet form. The steps in making SMC include mixing and metering a thermosetting resin liquid or paste composition which is deposited onto a carrier film, e.g., polyethylene. Chopped reinforcement (usually glass fibers or mat) is deposited onto the resin on the carrier film and then covered with a second resin coated film. The "sandwiched" sheet is passed through a series of rollers to achieve "wet out" of the glass reinforcement and finally rolled into coils for storage prior to use.

During storage the viscosity of the resin composition increases through action of a chemical thickening agent included in the resin liquid or resin paste. The carrier film is usually removed from the composition prior to its being charged into the mold.

SMC has many of the advantages of premix. It can be molded into complex shapes; it can be formulated in a virtually unlimited variety of material combinations; it produces very little scrap in molding operations and it is low in cost. With SMC, there is more design freedom than in preform or mat molding. Internal ribs and bosses, molded in inserts and small radii are all practical when SMC is used.

Existing polyester resin compositions, while generally performing satisfactorily in these molding processes, are subject to several deficiencies. Parts molded from such polyester compositions are subject to shrinkage and warpage upon cooling, and often the molded product exhibits surface waviness, roughness, and sink marks, especially in the case of articles having relatively intricate shapes and of sections having nonuniform thickness.

To minimize warpage many parts must be cooled prior to removal from the mold or alternately placed in an external jig to maintain structural integrity during the cooling process. Both procedures are time consuming and expensive because of the added steps. The ability to remove a part from a hot mold with no warpage developing on cooling is both an operating and economic advantage.

A significant disadvantage of the prior art compositions was that they have rough and undulating surfaces exhibiting a characteristic pattern of reinforcing fibers. These rough surfaces are attributable, at least in part, to the shrinkage in volume which occurs as the resin composition polymerizes. While this may not be the only factor contributing to the poor surface smoothness of the moldings, it is thought to be a predominant factor.

Many applications for which fiber-reinforced resinous compositions are used are not critical with respect to surface smoothness; but, in certain uses such as automobile surface parts and appliance housings, for example, the characteristic rough suface is objectionable. Techniques useful for improving smoothness of glass fiber-reinforced moldings which find limited utility include the use of resin-rich gel coats or veil-like glass fiber surfacing mats. In both instances, a resin-rich surface is obtained which serves to submerge the reinforcing glass strands and make them less noticeable. These techniques add processing steps and/or cost to the production of the articles.

Often it is desirable to paint moldings used in automotive applications, for example, to achieve a smooth, metal-like, high-gloss appearance. In order to accomplish this, it is common practice to resort to time and manpower consuming dry-sanding operations to improve the surface smoothness before applying the finish coating. Such a surface correcting technique is used in the present production of glass fiber-reinforced polyester automobile bodies. In this application, the cost of the dry-sanding is a substantial factor in the overall cost of finishing the automobile bodies.

SUMMARY OF THE INVENTION

The thermosetting molding compositions of this invention are prepared using polymerizable unsaturated polyesters, polymerizable unsaturated monomers and a thermoplastic polymer derived from the polymerization of a mixture of vinyl chloride and vinyl acetate. The compositions contain from about 20 to about 60 parts by weight of the polyester component, from about 20 to about 65 parts by weight of the monomer component, and from about 2.0 to about 25 parts by weight of the vinyl chloride/vinyl acetate polymer component. These compositions are formulated using effective amounts of auxiliary materials such as fillers (reinforcing agents), stabilizers, accelerators, mold release agents, pigments and the like.

By utilizing these compositions, articles are produced which have a high degree of surface smoothness, sufficient in most instances to allow direct application of a protective and decorative coating such as paint, lacquer or the like, and which produce faithfully and with high fidelity the mold design with which they may have been made. Use of these compositions avoids application of resin-rich gel coats or expensive and time-consuming sanding or other mechanical prefinishing operations. Molding compositions providing molded articles exhibiting relatively low shrinkage, nonwarp and excellent surface characteristics also are provided.

It is an object of this invention to overcome the above-noted deficiencies in the prior art and to provide a thermosetting molding composition which, when molded, exhibits relatively low shrinkage, dimensional stability and has improved surface characteristics. Another object of this invention is to provide a composition and method of preparation for a polymer derived from the polymerization of a mixture of vinyl chloride and vinyl acetate which provides a polyester resin composition having the relatively low shrinkage, nonwarp, improved surface characteristics. Other objects will become apparent from the detailed description given hereinafter. It is intended that this description and specific examples merely indicate preferred embodiments and are not to be regarded as limiting this invention since various changes and modifications within the scope of this invention will become apparent to those skilled in the art.

To provide the compositions of this invention, the thermoplastic polymer component additive is required. However, it must not increase significantly the viscosity of the formulation. The objectives of this invention can be achieved (1) by minimizing the level of the thermoplastic polymer component employed, (2) by controlling the solubility and molecular structure of the thermoplastic polymer component in the unsaturated monomer and polyester resin components, (3) by lowering the molecular weight of the thermoplastic polymer component, or (4) by combinations of methods (1), (2), and (3). Normal poly(vinyl chloride) homopolymers do not dissolve readily in the unsaturated monomers utilized in this invention. Low molecular weight polymers normally are prepared by the introduction of agents which act as chain terminators and/or as chain transfer agents. These agents can introduce sites which are not thermally stable at the elevated temperatures required for curing of the resin composition and therefore are not acceptable for use in these applications. Similarly, vinyl chloride polymers usually are prepared in systems wherein all the polymerization initiator is charged initially to the polymerization reactor. Due to the extended half-life of the initiator, residues may remain in the formed polymer which can contribute to polymer degradation during succeeding processing steps.

The product of this invention is achieved by polymerizing a mixture of vinyl chloride (15–85 wt. percent) and vinyl acetate (85–15 wt. percent) at elevated temperatures (65–130° C.) in the presence of a suspending agent and a free radical initiator system.

The preferred embodiment of this invention involves polymerizing a mixture of vinyl chloride (25–75 wt. percent) and vinyl acetate (75–25 wt. percent) at 80–110° C. in the presence of 0.02–1.00 wt. percent of a suspending agent such as poly(vinyl alcohol) or poly(vinyl pyrrolidone) or combinations, and 0.02–1.00 wt. percent of a free radical initiator whose half-life is such that it can be pumped into the reactor during the reaction period and is decomposed within a minimum period of time.

The product of this process is soluble in the monomers normally used in polyester resin technology, has a sufficiently low molecular weight such that formulation viscosities are not significantly affected by its incorporation, does not possess residual initiator fragments to affect stability properties and in combination with the previously described thermosetting composition components provides molded parts with improved surface smoothness, low shrink, and nonwarp characteristics.

DESCRIPTION OF PREFERRED EMBODIMENTS

The following proportions of resin component can be used in the formulation of preferred embodiments of resin compositions within the scope of this invention.

| Resin components: | Parts by weight |
|---|---|
| Unsaturated polyester | 30–60 |
| Unsaturated monomer | 20–65 |
| Thermoplastic polymer derived from the polymerization of a mixture of vinyl chloride and vinyl acetate | 4–20 |

| Formulation component: | Parts by weight per 100 parts by weight of resin system |
|---|---|
| Resin system | 100 |
| Filler | 0–250 |
| Fiber reinforcement | 0–350 |

Initiators, mold release agents, pigments and colorants, inhibitors, accelerators, chemical thickening agents, etc., are added as required and as customary in the art.

In the practice of the invention, the preferred polymerizable unsaturated polyhydric alcohol-polycarboxylic acid polyesters are the so-called "linear" polyesters, i.e., those which have very little cross-linking in the polyester molecules, as evidenced by the fact that such polyesters are soluble in solvents such as acetone.

Polymerizable unsaturated polyhydric alcohol-polycarboxylic acid polyesters useable in the practice of the invention may be prepared by reaction of one or more polyhydric alcohols and one or more polybasic acids. The proportion of polyhydric alcohols having more than two hydroxy groups, such as glycerol or pentaerythritol, and the proportion of polycarboxylic acid having more than two carboxy groups, such as citric acid, preferably is small so that in the production of the polyester there may be maximum esterification of the hydroxy and carboxy groups without attainment of excessive viscosity (through cross-linking).

Such polyesters are formed mainly by esterification of a dihydric alcohol and dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e.g., less than about 5 mole percent of the alcohol) is replaced by a polyhydric alcohol containing more than two alcohol radicals, such as glycerol or pentaerythritol or a small proportion of the dibasic acid (e.g., less than about 5 mole percent of the acid) is replaced by a polybasic acid containing more than two acid radicals, such as citric acid. The preferred linear polyester for use in the practice of the invention is prepared by carrying out the esterification reaction substantially to completion (i.e., to an acid number of less than about 80) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

A typical example of a polyester useful in this invention is a product prepared by the reaction of (1) an α,β-ethylenically unsaturated dicarboxylic acid such as fumaric, maleic, itaconic, citraconic, mesaconic or chloromaleic acid or anhydride or mixtures of these acids with (2) a dihydric alcohol such as any polymethylene glycol in the series from ethylene glycol to decamethylene glycol, propylene glycol, any butylene glycol, any polyethylene glycol in the series from diethylene glycol to decaethylene glycol, dipropylene glycol and its higher homologs, any glycerol monobasic acid monoester (in either the α- or β-position) such as monoformin or monoacetin, any monoether of glycerol with a monohydric alcohol such as monomethylin or monoethylin, or any dihydroxy alkane, in which the hydroxy radicals are attached to carbon atoms that are primary or secondary or both in the series from dihydroxy butane through dihydroxy decane.

Part of the unsaturated dicarboxylic acid may be replaced by a saturated dicarboxylic acid, such as any normal acid in the series from oxalic acid and malonic acid to sebacic acid or any benzene dicarboxylic acid such as ortho-phthalic, meta-phthalic, para-phthalic, or tetrahydrophthalic acid or anhydride, naphthalene dicarboxylic or cyclohexane dicarboxylic acid or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol or butanetetrol-1,2,3,4, a trihydroxy normal alkane having from four to five carbon atoms such as butanetriol-1,2,3 or a monoalkyl ether of pentaerythritol or butanetetrol-1,2,3,4 in which the alkyl radical has from one to four carbon atoms and has from one to two hydrogen atoms attached to the same carbon atoms as the ether linkage, such as the monomethyl or monoisobutyl ether of pentaerythritol.

Preferred polyesters include those derived from 0.8–1.2 moles of ethylene glycol, diethylene glycol, propylene glycol, dipropylene glycol and neopentyl glycol for each 1.0 mole of maleic and/or fumaric, ortho-phthalic, isophthalic, tetrahydrophthalic and adipic acids or their anhydrides. Modified diethylene, dipropylene, ethylene, propylene or neopentyl maleates or fumarates also may be employed as well as bisphenol modified and halogenated or phosphorous containing acids or glycols which yield chemical and flame resistant polyesters. These compounds are preferred from a standpoint of economics and the desirable properties that they produce in the end product.

The copolymerizable ethylenically unsaturated monomeric component contains at least one

group to cross-link with the unsaturated polyester. Styrene, chlorostyrene, t-butylstyrene, vinyltoluene, diallyl phthalate, vinyl acetate and methyl methacrylate are presently preferred as the cross-linking monomer because of their availability, reactivity, and desirable properties, although many other monomers also may be employed. Other monomers include acrylonitrile, divinylbenzene, alpha-methylstyrene, fluorostyrene, dimethallyl phthalate, triallyl cyanurate, triallyl phosphate, allyl diglycolate, diallyl phenyl phosphonate, diethylene glycol bis(allyl carbonate), 1,2-propylene glycol bis(allyl carbonate), bis(allyl lactate) carbonate, allyl succinyl allyl glycolate, allyl maleate, methallyl maleate, allyl methacrylates such as ethyl methacrylate, alkyl acrylates such as methyl acrylate, ethyl acrylate, propyl acrylate, and butyl acrylate, allyl acetate, triallyl isocyanurate, trishydroxy ethylisocyanurate, trimethylol propane trimethacrylate, ethylene glycol dimethacrylate, diethylene glycol dimethacrylate diacetone acrylamide, dibutyl fumarate, bis(beta chloroethyl) vinyl phosphonate, and the like.

In the preparation of the polymerizable unsaturated polyester, any of the usual modifiers such as monobasic acids and monohydric alcohols also may be added. The larger the proportions of monobasic acid and monohydric alcohols, the lower is the average number of acid and alcohol residues in the resulting polyester molecules and the lower is the viscosity of the polyester. On the other hand, the more nearly equal the molecular proportions of dibasic acid and dihydric alcohol, the greater is the average number of residues in the resulting polyester molecules and the greater is the viscosity. The proportions of ingredients used are those proportions that produce a polymerizable polyester of the desired viscosity. Other properties of the polyester, such as solubility in various solvents also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The thermoplastic polymer derived from the polymerization of a mixture of vinyl chloride and vinyl acetate useful in this invention is described in detail below.

The mixture of polyester, monomer and polymer may be cured by the action of heat alone, or preferably by the addition to the mass of suitable curing initiators. Useful curing initiators include benzoyl peroxide, t-butyl peroctoate, di-t-butyl peroctoate, t-butyl perbenzoate, cyclohexanone peroxide, di-t-butyl peroxide, t-butyl peracetate, t-butyl peroxy isopropyl carbonate, t-butyl azobisisobutyronitrile, di-t-butyl diperphthalate, 2,5-dimethyl-2,5-bis(2-ethylhexanoylperoxy)hexane, 1,1-di-t-butylperoxy,3,3,5-trimethylcyclohexane, 2-(t-butylazo)isobutyronitrile, lauryl peroxide, isopropylbenzene hydroperoxide, t-butylbenzene hydroperoxide, methyl ethyl ketone peroxide, 1-hydroxycyclohexylhydroperoxide-1, and the like or combinations of the above initiators.

Useful concentrations of initiator range from about 0.1% to about 3.0% by weight based on the three-component resinous composition. Curing of the composition is carried out under heat and pressure typically in closed, preferably positive pressure type molds. The rate of cure of the composition may also be modified by the addition of suitable inhibitors such as hydroquinone, t-butylcatechol, benzaldehyde or tetrachloroquinone and of suitable promoters such as certain amines like dimethylaniline, diethylaniline, di-n-propylaniline, dimethyl-p-toluidine, p-diethylaminoazobenzene, and dimethyl-m-aminophenol and metallic salts such as cobalt and manganese naphthenate. These polymerization inhibitors and accelerators may be added to the compositions to perform their normal function, as is well understood in the art.

Fillers are preferably added to the molding composition to reduce the resin requirement and/or enhance the physical properties of the molded object. Examples are mineral fillers such as clay, ground limestone or whiting gypsum, talc, calcium carbonate, and cellulose in any form. Aluminum hydrate, sodium borate and antimony oxide may be used to enhance flame resistance. Additional fillers also useful as reinforcing agents include chopped glass fiber, glass mat, sisal, asbestos and other synthetic fibers such as nylon, polyester and acrylic fibers as well as high temperature fibers notably carbon and boron fibers.

Additional additives such as plasticizers, mold lubricants and coloring matter such as pigments or dyes also are usually present in the molding composition. The amount used in the case of each of such additives being the usual amount consistent with its particular function in the molding composition.

In a preferred process for preparing a molding composition for use in compression molding 50–70 wt. percent of an unsaturated polyester usually is blended with 50–30 wt. percent of an unsaturated monomer in order to make a liquid for ease of handling and the remaining monomer is preblended in with the normally solid thermoplastic polymer to make a syrup. The two monomer solutions can be shipped separately or as an added feature of this invention as a one-component, homogenous, non-separating mixture.

To prepare polymers useful as the thermoplastic polymer component in the compositions of this invention, a monomeric mixture of vinyl chloride with vinyl acetate is charged to a reactor containing an aqueous medium in which a suitable suspending or dispersing agent is dissolved. Thereafter, the aqueous monomer suspension is heated with agitation to a temperature from about 50° C. to about 130° C., after which sufficient water is pumped into the reactor to attain a pressure which is at least equivalent and preferably above the vapor pressure of the monomer or monomers at the particular polymerization temperature employed. While agitation of the monomer suspension is continued, a free-radical generating catalyst then is fed into the reactor either as a single charge or continuously during the reaction. Additional details on the preparation of these polymers are given in copending U.S. Ser. No. 180,848, filed on Sept. 15, 1971, which is a continuation-in-part of U.S. Ser. No. 761,840 (Joseph J. Dietrich), filed on Sept. 23, 1968, and now abandoned.

Depending upon the polymerization temperature and catalyst employed, the polymer products have viscosity numbers ranging from about 0.10 to 1.10. (Viscosity number, V.N., is defined in Example 16.) Where a polymer with an exceptionally low average polymer molecular weight is desired, a chain terminating agent may be incorporated in the reaction mixture. Thus, polymer products having a viscosity number as low as 0.08 can be obtained. Chain terminating or transfer agents suitably employed in the process include lower aliphatic alcohols, e.g., isopropyl alcohol and halogenated, e.g., chlorinated or brominated hydrocarbons having 1–6 carbon atoms.

For a fuller understanding of the nature and objects of this invention, reference may be made to the following examples. These examples are given merely to illustrate the invention and are not to be construed in a limiting sense. All parts, proportions, percentages and quantities are by weight unless otherwise indicated. The terms g., ml., and ° C. are used to indicate grams, milliliter, and degrees centigrade respectively in these examples.

EXAMPLE 1

An unsaturated polyester is prepared by esterifying 1.10 M of propylene glycol with 0.33 M of isophthalic acid and 0.67 M of maleic anhydride to an acid number of less than 65. (Acid value is defined as the number of milligrams of alkali, calculated as potassium hydroxide, required to neutralize the free acid in one gram of sample.)

The polyester then is dissolved in styrene at approximately 67 weight percent solids.

EXAMPLES 2–10

Polyesters are prepared as in Example 1 except for the compositional changes and acid values indicated in Table 1.

TABLE 1.—UNSATURATED POLYESTER COMPOSITIONS

| Example number | 1 | 2 | 3 | 4 | 5 | 6 | 7 | 8 | 9 | 10 |
|---|---|---|---|---|---|---|---|---|---|---|
| Propylene glycol (p.b.m.)[1] | 1.10 | 1.10 | 1.10 | 1.10 | 1.10 | 1.10 | 1.05 | 1.05 | 1.05 | 1.09 |
| Isophthalic acid (p.b.m.) | 0.33 | 0.33 | 0.33 | 0.50 | 0.60 | 0.67 | 0.33 | 0.33 | 0.33 | |
| Phthalic anhydride (p.b.m.) | | | | | | | | | | 0.54 |
| Maleic anhydride (p.b.m.) | 0.67 | 0.67 | 0.67 | 0.50 | 0.40 | 0.33 | | | | 0.44 |
| Fumaric acid (p.b.m.) | | | | | | | 0.67 | 0.67 | 0.67 | |
| Acid value | <65 | <45 | <20 | <20 | <25 | <20 | <50 | <35 | <25 | <35 |
| Percent solids in styrene (percent by wt.) | 67 | 67 | 68 | 66 | 67 | 66 | 67 | 67 | 67 | 73 |

[1] p.b.m. = parts by mole.

EXAMPLE 11

An unsaturated polyester is prepared by esterifying 1.10 M of ethylene glycol with 0.50 M of tetrahydrophthalic anhydride and 0.50 M of maleic anhydride to an acid number of less than 35. Bromine (0.5 M) is added to the tetrahydrophthalic moiety according to the process of U.S. Pat. No. 3,536,782 in which the maleic unsaturation remains intact. After bromination, the polyester is dissolved in styrene at 70 percent solids by weight.

EXAMPLES 12–15

Examples 12–15 are commercial unsaturated polyester resins listed in Table 2.

TABLE 2.—COMMERCIAL UNSATURATED POLYESTER RESINS

| Example No. | Supplier | Commercial polyester | Acid value[1] |
|---|---|---|---|
| 12 | Rohm and Haas | Paraplex P-340 | <20 |
| 13 | North American Rockwell | 2010 | <15 |
| 14 | do | 2117 | <25 |
| 15 | do | 3171 | <25 |

[1] Styrene solutions as received.

EXAMPLE 16

A one-gallon pressure reactor is equipped with an agitator, a thermocouple for temperature measurement, a pressure gauge for pressure measurement, a temperature controller and associated heating and cooling elements for controlling temperature, a pressure controller, baffles, rupture disk and external pumps for adding initiator solutions and water to the reactor.

To the reactor are charged the following items:

22.6 g. of 5.3% PVP–K90—poly(vinyl pyrrolidone) water solution (suspending agent), GAF Corp., N.Y., N.Y.
0.5 g. $NH_4HCO_3$ (buffer)
1500 ml. water The reactor is closed, sealed, and evacuated to 26 in. of mercury vacuum (~3 in. of mercury pressure) utilizing a vacuum pump. The reactor then is brought to atmospheric pressure by disconnecting the vacuum source and introducing vinyl chloride monomer. The evacuation and vinyl chloride addition step is repeated. A final evacuation step is performed prior to adding 500 g. of vinyl acetate and 500 g. of vinyl chloride to the reactor.

Reactor contents then are heated to a temperature of 100° C. and water is added to bring the reactor pressure to 500 p.s.i.g. The reactor is liquid full at this time and is maintained liquid full during reaction period by periodic addition of water. Twenty g. of t-butyl peroxypivalate are diluted to 100 ml. with methanol. Two ml. of this initiator solution is pumped into the reactor at 5-minute intervals. Initiator injection is continued for 40 minutes. The reactor contents are maintained at 100° C. for an additional 10 minutes to ensure complete decomposition of the initiator. Then the reactor is cooled to 20° C. The polymer formed is separated from water and other reactor contents by centrifuging at 20° C. Recovered polymer is white and granular in appearance. The polymer is dried to obtain 827 g. of dry, recovered polymer representing an 82.7% conversion of the vinyl chloride and vinyl acetate monomers charged.

The vinyl chloride level of the polymer determined from the chlorine analysis is 55 weight percent. The molecular weight of the polymer is characterized by solution viscosity measurements. The viscosity number (V.N.) is defined as:

$$V.N. = \frac{\text{(time of flow for a solution of 1 gram of polymer in 100 ml. of cyclohexanone)}}{\text{(time of flow for pure cyclohexanone)}} - 1$$

The time of flows is determined with a capillary viscometer at 30° C. and should be greater than 100 seconds to minimize measurement errors. The V.N. of this material is 0.32.

The viscosity number as defined herein is equivalent to the specific viscosity of a solution containing 1 gram of the polymer per 100 ml. of solvent. The term "specific viscosity" is defined in the the ASTM Standard Method of Test D 1243-66 (Appendix), i.e., that the specific viscosity of a polymer corresponds to its relative viscosity minus one. Relative viscosity represents the ratio of the flow time of a polymer solution of specified concentration to the flow time of the pure solvent. Hence, specific viscosity, or viscosity number as used herein, represents the increase in viscosity of a polymer solution which may be attributed to the polymeric solute.

EXAMPLE 17

A resinous composition incorporating the polyester of Example 4 is utilized to prepare the following preform formulation:

(a) 86 parts by wt. of the polyester-styrene solution of Example 4
(b) 100 parts by wt. Suspenso [1] (filler)
(c) 1.0 part by wt. t-butyl peroctoate (initiator)
(d) 0.5 part by wt. Zelec UN [2] (mold release)
(e) 14 parts by wt. styrene

[1] Diamond Shamrock Corporation, calcium carbonate.
[2] E. I. du Pont de Nemours.

Items (a), (c), (d), and (e) are combined and mixed with a high-shear mixer for 1–2 minutes. Item (b) is added slowly to the previously blended items (a), (c), (d), and (e) using low speed agitation. Item (b) is added in 1–2 minutes. The blended system then is mixed with the high-shear mixer for 4–5 minutes.

The formulation thus prepared is poured onto 2 plies of 2 oz./ft.$^2$ glass mat (O.C.F. M8600—Owens-Corning Fiberglas Corp.) and covered with 10 mil veil. The impregnated mat is molded at 275° F. and 500 p.s.i.g. for 2 minutes, removed from the mold and then allowed to cool to room temperature. The mold used to make the test part is 12″ x 12″ x 0.100″. The part is badly warped.

The surface smoothness of the molded panel is determined with a Bendix Microcorder (Bendix Corp., Industrial Metrology Division) and Profilometer (Bendix Corp., Industrial Metrology Division), according to the procedure specified in manufacturer manual No. 30,440. The microcorder reading is determined by measuring in four random areas. Each reading is the average of four half-inch segments along a two-inch trace. The average of the four traces constitutes the required micro-inch reading for the entire panel.

The average surface smoothness of the panel prepared is 840 microinches (Bendix Microcorder) and 18.0 units (Profilometer Reading). Low readings on both scales are preferred (i.e., smoother surfaces).

EXAMPLE 18

A resinous composition incorporating the polyester of Example 4 and the polymer derived from the polymerization of vinyl chloride and vinyl acetate of Example 16 is utilized to prepare the following preform formulation:

(a) 64 parts by wt. of the polyester-styrene solution of Example 4
(b) 36 parts by wt. of the polymer of Example 16 dissolved in styrene (35% by wt. solids)
(c) 67 parts by wt. Suspension [1] (filler)
(d) 1.0 part by wt. t-butyl peroctoate (initiator)
(e) 0.5 part by wt. Zelec UN [2] (mold release)

[1] Diamond Shamrock Corporation, calcium carbonate.
[2] E. I. du Pont de Nemours.

Items (a), (b), (d), and (e) are combined and mixed with a high-shear mixer for 1–2 minutes. Item (c) is slowly added to the previously blended items (a), (b), (d), and (e) using low speed agitation. Item c is added in 1–2 minutes. The blended system is then mixed with the high-shear mixer for 4–5 minutes.

The formulation thus prepared then is poured onto 2 plies of 2 oz./ft.$^2$ glass mat (O.C.F. M8600—Owens-Corning Fiberglas Corp.) and covered with 10-mil veil. The impregnated mat is molded at 275° F. and 500 p.s.i.g. for 2 minutes, removed from the mold and then allowed to cool to room temperature. The same mold used in Example 17 is employed. The part shows no sign of warpage.

The surface smoothness of the molded panel is determined with a Bendix Microcorder (Bendix Corp., Industrial Metrology Division), according to the specified procedure.

The average surface smoothness of the panel prepared is 275 microinches.

Examples 17 and 19 are control samples containing no thermoplastic additive.

EXAMPLES 19–35

Examples 19–35 follow the procedures outlined in Examples 18 and 19 except that the formulation components are varied. Table 3 presents formulation data and results obtained.

TABLE 3

| Example number | 17 | 18 | 19 | 20 | 21 | 22 | 23 | 24 | 25 | 26 |
|---|---|---|---|---|---|---|---|---|---|---|
| Polyester of example number | 4 | 4 | 7 | 7 | 7 | 7 | 7 | 1 | 2 | 3 |
| Polyester (p.b.w.)* | 86 | 64 | 86 | 70 | 56 | 60.8 | 65.6 | 56 | 56 | 64 |
| Polymer of Example 16 (p.b.w.) | 0 | 12.6 | 0 | 13.5 | 13.5 | 10.8 | 8.6 | 13.5 | 13.5 | 12.6 |
| Styrene (p.b.w.) | 14 | 23.4 | 14 | 16.5 | 30.5 | 28.4 | 26.8 | 30.5 | 30.5 | 23.4 |
| Filler (p.b.w.)a | 100 | 67 | 100 | 67 | 100 | 100 | 100 | 100 | 100 | 67 |
| Glass (p.b.w.)b | 65 | 65 | 65 | 65 | 65 | 65 | 65 | 65 | 65 | 65 |
| Mold release agent (p.b.w.)c | 0.5–3.0 | 0.5–3.0 | 0.5–3.0 | 0.5–3.0 | 0.5–3.0 | 0.5–3.0 | 0.5–3.0 | 0.5–3.0 | 0.5–3.0 | 0.5–3.0 |
| Initiator (p.b.w.)d | 1.0 | 1.0 | 1.0 | 1.0 | 1.0 | 1.0 | 1.0 | 1.0 | 1.0 | 1.0 |
| MCR (microinches)e | f 840 | g 275 | f 400 | g 180 | g 132 | g 145 | g 133 | g 260 | g 195 | g 220 |
| Profilometer (units) | 18 | | | | | | | | | 5.5 |

| Example number | 27 | 28 | 29 | 30 | 31 | 32 | 33 | 34 | 35 |
|---|---|---|---|---|---|---|---|---|---|
| Polyester of example number | 5 | 6 | 8 | 9 | 10 | 12 | 13 | 14 | 15 |
| Polyester (p.b.w.)* | 69.6 | 69.5 | 56 | 56 | 69.5 | 70 | 56 | 56 | 56 |
| Polymer of Example 16 (p.b.w.) | 13.7 | 13.7 | 13.5 | 13.5 | 13.7 | 13.5 | 13.5 | 13.5 | 13.5 |
| Styrene (p.b.w.) | 16.8 | 16.8 | 30.5 | 30.5 | 16.8 | 16.5 | 30.5 | 30.5 | 30.5 |
| Filler (p.b.w.)a | 67 | 67 | 100 | 100 | 67 | 67 | 100 | 100 | 100 |
| Glass (p.b.w.)b | 65 | 65 | 65 | 65 | 65 | 65 | 65 | 65 | 65 |
| Mold release agent (p.b.w.)c | 0.5–3.0 | 0.5–3.0 | 0.5–3.0 | 0.5–3.0 | 0.5–3.0 | 0.5–3.0 | 0.5–3.0 | 0.5–3.0 | 0.5–3.0 |
| Initiator (p.b.w.)d | 1.0 | 1.0 | 1.0 | 1.0 | 1.0 | 1.0 | 1.0 | 1.0 | 1.0 |
| MCR (microinches)e | | | s 109 | g 165 | | g 139 | g 178 | g 269 | g 118 |
| Profilometer (units) | g 7.0 | g 11.0 | | | g 8.0 | | | | | a Suspenso, Calcium Carbonate—Diamond Shamrock Corp.
b M8600—Owens-Corning Fiberglas Corp.
c Zelec UN (E. I. du Pont de Nemours) or zinc stearate.
d t-Butyl perbenzoate or t-butyl peroctoate.
e MCR=Surface smoothness as measured by a Bendix Microcorder.
f Panels badly warped.
g No warpage.
* p.b.w.=parts by weight.

Examples 36–39 describe methods and conditions for carrying out the polymerization of a mixture of vinyl chloride and vinyl acetate to produce the thermoplastic polymer component useful in this invention.

EXAMPLE 36

A one-gallon pressure reactor is equipped as in Example 16. Also included is a pressure activated system for incremental addition of vinyl chloride during the polymerization. This consists of a high pressure bomb containing vinyl chloride under nitrogen pressure connected to the reactor through a throttling valve set to maintain pressure in the reactor at 80 p.s.i.g., and a balance to measure the weight of added vinyl chloride. The purpose of vinyl chloride addition during the reaction is to promote a more homogeneous polymer product.

The reactor is closed, sealed, and evacuated to 26 in. of mercury vacuum (~3 in. of mercury pressure) utilizing a vacuum pump. The reactor then is brought to atmospheric pressure by disconnecting the vacuum source and introducing vinyl chloride monomer. The evacuation and vinyl chloride addition step is repeated. A final evacuation step is performed prior to adding 110 g. of vinyl chloride to the reactor.

To the reactor are charged the following items:

66.6 g. of 2.25% Elvanol 50–42—poly(vinyl alcohol) water solution (suspending agent), E. I. du Pont de Nemours
500 g. vinyl acetate
2235 ml. $H_2O$ The reactor contents then are heated to a temperature of 90° C. The reactor is 95% full at this time.

Twenty g. of t-butyl peroxypivalate (75% in mineral spirits) are diluted to 100 ml. with methanol. Four ml. of this solution is pumped into the reactor initially, then at 10 minute intervals at the rate of 2 ml. Initiator injection is continued for 345 minutes. The reactor contents are maintained at 90° C. for an additional 30 minutes to ensure complete decomposition of the initiator.

Two hundred seventy-four g. of vinyl chloride are metered into the reactor continuously during the polymerization.

The polymer formed is separated from the water and other reactor contents by centrifuging at 20° C.

The polymer is dried. Recovered polymer amounts to 771 g. and corresponds to a 87% conversion of the vinyl chloride and vinyl acetate monomers charged.

The vinyl chloride level of the copolymer determined from chlorine analysis is 41.8 weight percent. The molecular weight of the polymer is characterized by solution viscosity measurements.

The V.N. of this material is 0.56.

EXAMPLE 37

A one-gallon pressure reactor is equipped as in Example 16. To the reactor are charged the following items:

66.6 g. of 2.25% Elvanol 50–42—poly(vinyl alcohol) water solution
250 g. of vinyl acetate
1500 ml. $H_2O$ The reactor is closed, sealed, and evacuated to 26 in. of mercury vacuum (~3 in. of mercury pressure) utilizing a vacuum pump. The reactor then is brought to atmospheric pressure by disconnecting the vacuum source and introducing vinyl chloride monomer. The evacuation and vinyl chloride addition step is repeated. A final evacuation step is performed prior to adding 750 g. of vinyl chloride to the reactor.

The reactor contents then are heated to a temperature of 100° C. and water is added to bring the reactor pressure to 500 p.s.i.g. The reactor is maintained liquid full as in Example 16.

Twenty g. of t-butyl peroxypivalate are diluted to 100 ml. with methanol and injected into the reactor at 5 minute intervals at the rate of 2 ml. Initiator injection is continued for 40 minutes. Reactor contents are maintained at 100° C. for an additional 10 minutes to ensure complete decomposition of the initiator.

The polymer formed is separated from water and other reactor contents by decantation and is dried. Recovered polymer amounts to 830 g. and represents an 83% conversion of the vinyl chloride and vinyl acetate monomers charged.

The vinyl chloride level of the polymer determined from chlorine analysis is 78.5 weight percent. Molecular weight of the polymer is characterized by solution viscosity measurements. The V.N. of this material is 0.36.

EXAMPLE 38

A one-gallon pressure reactor is equipped as in Example 16. To the reactor are charged the following items:

0.5 g. $NH_4HCO_3$ (buffer)
22.6 g. of 5.3% PVP–K90—poly(vinyl pyrrolidone) water solution
1500 ml. $H_2O$ The reactor is closed, sealed, and evacuated to 26 in. of mercury vacuum (~3 in. of mercury pressure) utilizing a vacuum pump. The reactor then is brought to atmospheric pressure by disconnecting the vacuum source and introducing vinyl chloride monomer. The evacuation and vinyl chloride addition step is repeated. A final evacuation step is performed prior to adding 400 g. vinyl acetate and 600 g. of vinyl chloride to the reactor.

15

Examples 55-60 illustrate the use of the compositions of this invention in Sheet Molding Compound applications.

EXAMPLE 55

A resinous composition incorporating the polyester of Example 3 and vinyl chloride copolymer of Example 16 is utilized to prepare the following formulation:

(a) 66.6 parts by wt. of the polyester-styrene solution of Example 3
(b) 28.6 parts by wt. of the polymer of Example 16 dissolved in styrene (45% by wt. solids)
(c) 95 parts by wt. Suspenso—Diamond Shamrock Corporation (filler)
(d) 1.0 parts by wt. t-butyl peroctoate (initiator)
(e) 1.0 parts by wt. Zelec UN (mold release agent)
(f) 4.8 parts by wt. styrene
(g) 0.5 part by wt. magnesium oxide (chemical thickening agent)

Items (a), (b), (d), (e), and (f) are combined and mixed with a high-shear mixer until thoroughly mixed. Item (c) is slowly added to the previously blended items (a), (b), (d), (e), and (f) and mixed until thoroughly blended. Item (g) is then added with constant mixing.

The described formulation is applied to 1-inch long glass fibers (O.C.F. 495AA—Owens-Corning Figerglas Corp), 87.5 parts using a Sheet Molding Compound Machine.

After aging, the sheet is molded at 300° F. and 1000 p.s.i.g. for 2 minutes, removed from the mold and allowed to cool to room temperature. No warpage is evidenced.

The surface smoothness of the molded panel is determined with a Bendix Microcorder.

The average surface smoothness of the panel prepared is 275 microinches. Additional data are given in Table 6. Panels prepared in Examples 55-60 do not exhibit warpage.

16

(c) 66.6 parts by wt. Suspenso (filler)
(d) 1.0 part by wt. t-butyl peroctoate (initiator)
(e) 0.5 part by wt. Zelec UN (mold release agent)

Items (a), (b), (d), and (e) are combined and mixed with a high-shear mixer for 1-2 minutes. Item (c) is slowly added to the previously blended items (a), (b), (d), and (e) using low speed agitation. Item (c) is added in 1-2 minutes. The blended system is then mixed with the high-shear mixer for 4-5 minutes.

The formulation thus prepared is poured onto glass mat (O.C.F. M8600), 2 plies of 2 oz./ft.$^2$ glass and 10-mil veil. The impregnated mat is molded at 285° F. and 500 p.s.i.g. for 2 minutes, removed from the mold and then allowed to cool to room temperature.

The surface smoothness of the molded panel is determined with a Bendix Microcorder, according to the specified procedure.

The average surface smoothness of the panel prepared is tabulated below. None of the panels exhibits warpage.

| Solvent mix (parts by wt.) | | | MCR, micro-inches |
|---|---|---|---|
| Styrene | Vinyl acetate | Methyl methacrylate | |
| 1 | | | 350 |
| | 1 | | 637 |
| | | 1 | 650 |
| 1 | | 1 | 425 |
| | 1 | 1 | 475 |
| 1 | 1 | | 362 |

EXAMPLE 62

Pigmented preform systems are prepared using the formulation described in Example 18 and the indicated quantities of the following pigments:

| Color | Color Index No. | Trade Name | Amount (phr.) |
|---|---|---|---|
| Yellow | 77600 | Fusecolor F-485[a] | 5.0 |
| Rose | 77196 | Shepherd No. 65[b] | 5.0 |
| Brown | 77495 | Ferro V-31160[c] | 5.0 |
| Green | 74260 | Pigment Dispersion No. 1400[d] | 0.5 |

[a] Fusecolor Corp., Middlesex, N.J.
[b] Shepherd Chemical Co., Cincinnati, Ohio.
[c] Ferro Corp., Bedford, Ohio.
[d] Pigment Dispersions, Iselin, N.J.

Uniform colors and surface smoothness readings equivalent to the unpigmented molded samples are obtained.

TABLE 6

| Example number | 55 | 56 | 57 | 58 | 59 | 60 |
|---|---|---|---|---|---|---|
| Polyester of example number | 3 | 3 | 4 | 3/4 | 7 | 7 |
| Polyester (p.b.w.) * | 66.6 | 64.4 | 64.4 | 27.5/27.5 | 56 | 56 |
| Polyester of example number | 16 | 16 | 16 | 16 | 16 | 16 |
| Polymer (p.b.w.) | 12.9 | 12.4 | 12.4 | 13.5 | 13.5 | 13.5 |
| Styrene (p.b.w.) | 20.5 | 23.2 | 23.2 | 31.5 | 30.5 | 30.5 |
| Filler (p.b.w.) | a 95 | b 115 | b 138 | b 40 / c 120 / d 11 | b 44 / c 131 | b 150 |
| Zelec UN (p.b.w.) | 1.0 | | | | | 1.0 |
| Zinc stearate (p.b.w.) | | 3.0 | 3.0 | 2.9 | 3.0 | |
| Initiator (p.b.w.) | h 1.0 | h 1.0 | h 1.0 | i 1.0 | i 1.0 | i 1.0 |
| Magnesium oxide (p.b.w.) | 0.5 | 3.0 | 3.0 | 1.4 | | |
| Calcium hydroxide (p.b.w.) | | | | | 2.0 | |
| Modifier M[e] | | | | | | 3.75 |
| Glass (p.b.w.) | f 83.5 | f 83.5 | f 92.5 | f 88.5 | f 86.5 | g 112 |
| MCR (microinches) | 275 | 285 | 460 | 185 | 125 | 165 |

[a] Suspenso (Diamond Shamrock Corp., calcium carbonate).
[b] Camel Wite (H. T. Campbell, calcium carbonate).
[c] Non Fer Al (Diamond Shamrock Corp., calcium carbonate).
[d] ASP 400 (Engelhard Minerals, clay).
[e] W. R. Grace (Marco Chemical Division).
[f] O.C.F. 495AA, 1" (Owens-Corning Fiberglas Corp).
[g] J.M. 323F, 1" (Johns-Manville).
[h] t-Butyl peroctoate.
[i] t-Butyl perbenzoate.
* p.b.w.=parts by weight.

EXAMPLE 61

A resinous composition incorporating the polyester of Example 4 and the polymer derived from the polymerization of a mixture of vinyl chloride and vinyl acetate of Example 16 is utilized to prepare the following formulation:

(a) 70 parts by wt. of the polyester-styrene solution of Example 4
(b) 30 parts by wt. of the vinyl chloride copolymer of Example 16 dissolved in solvent mix shown below (45% by wt. solids)

The reactor contents then are heated to a temperature of 100° C. and water is added to bring the reactor pressure to 400 p.s.i.g. The reactor is maintained liquid full as in Example 16.

Twenty g. of t-butyl peroxypivalate are diluted to 100 ml. with methanol and injected into the reactor at 5 minute intervals at the rate of 2 ml. Initiator injection is continued for 45 minutes. The reactor contents are maintained at 100° C. for an additional 15 minutes.

The polymer formed is separated from the water and other reactor contents by centrifuging. The polymer is dried. Recovered polymer amounts to 735 g. and represents a 73.5% conversion of the vinyl chloride and vinyl acetate monomers charged.

The vinyl chloride level of the copolymer determined from chlorine analysis is 64.6 weight percent. Molecular weight of the polymer is characterized by solution viscosity measurements. The V.N. of this material is 0.36.

EXAMPLE 36

A one-gallon pressure reactor is equipped as in Example 16. To the reactor are charged the following items:

0.90 g. PVP–K90—poly(vinyl pyrrolidone)
0.46 g. $NH_4HCO_3$
0.22 g. Elvanol 50–42—poly(vinyl alcohol)
2360 ml. $H_2O$ The reactor is closed, sealed, and evacuated to 26 in. of mercury vacuum (~3 in. of mercury pressure) utilizing a vacuum pump. The reactor then is brought to atmospheric pressure by disconnecting the vacuum source and introducing vinyl chloride monomer. The evacuation and vinyl chloride addition step is repeated, and 454 g. of vinyl acetate is charged. A final evacuation step is performed prior to adding 454 g. of vinyl chloride to the reactor.

The reactor contents then are heated to a temperature of 95° C. The reactor is 95% full at this time.

Twenty g. of t-butyl peroxypivalate are diluted to 100 ml. with methanol and pumped into the reactor at the rate of about 2 ml./minute at 5-minute intervals. Initiator injection is continued for 200 minutes. The reactor contents are maintained at 95° C. for an additional 25 minutes to ensure complete decomposition of the initiator.

The polymer formed is separated from the water and other reactor contents by centrifuging. The polymer is dried. Recovered polymer amounts to 835 g. and corresponds to a 92% conversion of the vinyl chloride and vinyl acetate monomers charged.

The vinyl chloride level of the copolymer determined from chlorine analysis is 55.4 weight percent. Molecular weight of the polymer is characterized by solution viscosity measurements. The V.N. of this material is 0.42.

EXAMPLES 40–44

Examples 40–44 describe formulations using the thermoplastic polymer components of Examples 36–38. Preform systems utilizing procedures described in Examples 17 and 18 are evaluated.

TABLE 4

| Example number | 40 | 41 | 42 | 43 | 44 |
|---|---|---|---|---|---|
| Polyester of Example 4 (p.b.w.) | 100 | 64 | 64 | 64 | 64 |
| Polymer of example | None | 36 | 37 | 38 | 39 |
| Polymer (p.b.w.) | 0 | 11.4 | 12.6 | 12.6 | 12.6 |
| Styrene (p.b.w.) | 0 | 24.6 | 23.4 | 23.4 | 23.4 |
| Filler (p.b.w.) a | 67 | 67 | 67 | 67 | 67 |
| Glass (p.b.w.) b | 65 | 65 | 65 | 65 | 65 |
| Mold release agent (p.b.w.) c | 0.5 | 0.5 | 0.5 | 0.5 | 0.5 |
| Initiator (p.b.w.) d | 1.0 | 1.0 | 1.0 | 1.0 | 1.0 |
| Profilometer | e18 | f7 | f8.5 | f6.5 | f7 | a Clay ASP-400—Engelhard Minerals and Chemicals Corp.
b M-8600—Owens-Corning Fiberglas Corp.
c Zelec UN—E. I. du Pont de Nemours.
d t-Butyl perbenzoate or t-butyl peroctoate.
e Badly warped.
f No warpage.

Examples 45–54 illustrate use of the thermoplastic polymer obtained from the polymerization of vinyl chloride and vinyl acetate in premix systems.

EXAMPLE 45

A resinous composition incorporating the polyester of Example 3 and the polymer derived from the polymerization of a mixture of vinyl chloride and vinyl acetate of Example 16 is utilized to prepare the following formulation:

Parts by weight
(a) Polyester-styrene solution of Example 3 _____ 69.5
(b) Vinyl chloride polymer of Example 16 dissolved in styrene (45% solids) _____ 30.5
(c) DACOTE—Diamond Shamrock Corp. (calcium carbonate, filler) _____ 128
(d) t-Butyl peroctoate (initiator) _____ 1.0
(e) Zelec UN—E. I. du Pont de Nemours (mold release agent) _____ 1.0
(f) Glass, O.C.F. No. 832, ¼"—Owens-Corning Fiberglas Corp. _____ 57

Items (a), (b), (d), and (e) are combined and mixed in a Sigma Blade Mixer. Item (c) is added slowly until the system is homogeneous. Item (f) is then added and thoroughly mixed. The mixture is removed from the mixer and molded at 300° F. and 1,000 p.s.i.g. for 2.0 minutes. The molded part is removed from the press and allowed to cool to room temperature. No warpage is evidenced.

The surface smoothness of the molded panel is determined with a Bendix Microcorder.

The average surface smoothness of the panel prepared is 195 microinches. Additional data are given in Table 5. Panels prepared in Examples 45–54 do not exhibit warpage.

TABLE 5

| Example number | 45 | 46 | 47 | 48 | 49 | 50 | 51 | 52 | 53 | 54 |
|---|---|---|---|---|---|---|---|---|---|---|
| Polyester of example number | 3 | 4 | 4 | 4 | 4 | 4 | 8 | 11 | 8/11 | 8 |
| Polyester (p.b.w.)* | 69.5 | 69.5 | 70 | 64 | 64 | 64 | 62 | 62 | 31/31 | 62 |
| Polymer of example number | 16 | 16 | 16 | 16 | 16 | 16 | 16 | 16 | 16 | 16 |
| Polymer (p.b.w.) | 13.7 | 13.7 | 13.5 | 12.6 | 12.6 | 12.6 | 13.5 | 13.5 | 13.5 | 13.5 |
| Styrene (p.b.w.) | 16.8 | 16.8 | 16.5 | 23.4 | 23.4 | 23.4 | 24.5 | 24.5 | 24.5 | 24.5 |
| Filler (p.b.w.) | a 128 | a 128 | a 128 | b 203 | a 32/c 185 | c 203 | d 150 | d 128 | d 128 | d 150 |
| Glass (p.b.w.) | e 57 | e 57 | f 57 | e 76 | e 80 | e 76 | e 62.05 | e 57 | e 57 | e 62.5 |
| Mold release agent (p.b.w.) | g 1.0 | g 1.0 | g 1.0 | g 1.0 | g 1.0 | g 1.0 | h 3.5 | g 1.8 | g 1.8 | h 3.5 |
| Initiator (p.b.w.) | j 1.0 | j 1.0 | j 1.0 | j 1.0 | j 1.0 | j 1.0 | j 1.0 | j 1.0 | j 1.0 | j 1.0 |
| Calcium hydroxide (p.b.w.) |  |  |  |  |  |  |  |  |  | 3.0 |
| MCR (microinches) | 195 | 243 | 230 | 210 | 195 | 241 | 120 | k 158 | l 164 | 142 | a Dacote (Diamond Shamrock Corp., calcium carbonate).
b Camel Wite (H. T. Cambell, calcium carbonate).
c Surfex MM (Diamond Shamrock Corp., calcium carbonate).
d Suspenso (Diamond Shamrock Corp., calcium carbonate).
e O.C.F. No. 832, ½" (Owens-Corning Fiberglas Corp.).
f J.M. CS 308A, ¼" (Johns Manville).
g Zelec UN (E. I. du Pont de Nemours).
h Zinc stearate.
i t-Butyl perbenzoate.
j t-Butyl peroctoate.
k Nonburning—ASTM D635.
l Self-extinguishing—ASTM D635.
*p.b.w.=parts by weight.

EXAMPLE 63

A beige pigmented premix system is prepared using the formulation described in Example 46 and 0.4 p.h.r., Ferro V–31160. Uniform color and surface smoothness readings equivalent to the unpigmented molded sample are obtained.

It is to be understood that although the invention has been described with specific reference to particular embodiments thereof, it is not to be so limited, since changes and alterations therein may be made which are within the full intended scope of this invention as defined by the appended claims.

What is claimed is:
1. A thermosetting molding composition comprising, by weight:
   (a) from about 20 to about 60 parts of a polymerizable unsaturated essentially linear polyhydric alcohol-polycarboxylic acid condensation polyester,
   (b) from about 20 to about 65 parts of a polymerizable unsaturated monomer, and
   (c) from about 2 to about 25 parts of a thermoplastic polymer derived by polymerizing in an aqueous medium, at a temperature of from 65° to about 130° C. and in the presence of a suspending agent and a free-radical initiator, a mixture containing, by weight, from about 15 to about 85 percent of vinyl chloride and from about 85 to about 15 percent of vinyl acetate, said thermoplastic polymer being soluble in component (b) and having a specific viscosity ranging from about 0.10 to 1.10, as measured at 30° C., employing a solution containing 1 gram of the polymer in 100 ml. of cyclohexanone.

2. The composition of claim 1 wherein (a) is a polymerizable unsaturated polyester prepared from an unsaturated dicarboxylic acid.

3. The compositions of claim 1 wherein (a) is a polymerizable unsaturated polyester prepared from maleic anhydride, isophthalic acid and alkylene glycol.

4. The composition of claim 1 wherein (a) is a polymerizable unsaturated polyester prepared from fumaric acid, isophthalic acid and alkylene glycol.

5. The composition of claim 1 wherein (a) is a halogenated fire-retardant polyester comprising the reaction product of
   (1) a polyester which is the product of the reaction of
      (A) an alpha, beta-ethylenic unsaturated dicarboxylic acid or anhydride containing up to about 20 carbon atoms per molecule;
      (B) an ethylenically unsaturated dicarboxylic acid or anhydride containing up to about 20 carbon atoms per molecule free of any alpha, beta-ethylenic unsaturation other than aromatic unsaturation; and
      (C) a polyhydric alcohol containing about 2 to 24 carbon atoms; and
   (2) a halogen selected from the group consisting of chlorine and bromine;
substantially all of the alpha, beta-ethylenic unsaturation remaining unreacted with the halogen; the amount of (A) comprising about 15 to about 67 mol percent of the polyester; the amount of (B) being sufficient to result in a halogenated polyester having a halogen content of about 10% to 50% by weight of the halogenated polyester; the amount of (C) being about 100 to 125% of the amount theoretically necessary to react with all of the carboxylic groups present; the amount of halogen being approximately that theoretically required to react with the non-alpha, beta-ethylenic unsaturation of (B).

6. The composition of claim 1 wherein (b) is styrene.

7. The composition of claim 1 wherein (b) is chlorostyrene.

8. The composition of claim 1 wherein (b) is t-butylstyrene.

9. The composition of claim 1 wherein (b) is vinyl acetate.

10. The composition of claim 1 wherein (b) is methyl methacrylate.

11. The composition of claim 1 wherein a filler is present.

12. The composition of claim 1 wherein a fiber reinforcement is present.

References Cited
UNITED STATES PATENTS

| | | | |
|---|---|---|---|
| 3,536,782 | 10/1970 | Toggweiler et al. | 260—75 H |
| 2,555,062 | 5/1951 | Small et al. | 260—873 |

FOREIGN PATENTS

| | | | |
|---|---|---|---|
| 232,412 | 3/1959 | Australia | 260—862 |
| 732,823 | 6/1955 | Great Britain | 260—862 |
| 6710031 | 1/1968 | Netherlands | 260—862 |

WILLIAM H. SHORT, Primary Examiner

E. WOODBERRY, Assistant Examiner

U.S. Cl. X.R.

260—9, 862